United States Patent [19]
Asai et al.

[11] Patent Number: 5,474,874
[45] Date of Patent: Dec. 12, 1995

[54] OPTICAL RECORDING MEDIUM

[75] Inventors: Nobutoshi Asai; Kouichi Yasuda, both of Kanagawa, Japan

[73] Assignee: Sony Corporation, Tokyo, Japan

[21] Appl. No.: 196,470

[22] Filed: Feb. 15, 1994

[30] Foreign Application Priority Data

Feb. 16, 1993 [JP] Japan .................................. 5-026805
Jul. 29, 1993 [JP] Japan .................................. 5-188396

[51] Int. Cl.$^6$ ........................................ G11B 7/24
[52] U.S. Cl. ...................... 430/275; 430/271; 430/270; 430/495; 430/945; 428/913; 428/914; 428/64.8; 428/65.1; 369/275.4; 369/284; 369/283; 346/135.1
[58] Field of Search ................ 430/495, 945, 430/270, 271, 275; 369/275.4, 284, 283; 346/135.1; 428/64, 65, 913, 914

[56] References Cited

U.S. PATENT DOCUMENTS

| | | | |
|---|---|---|---|
| 3,665,483 | 5/1972 | Becker et al. | 346/135.1 |
| 4,305,081 | 12/1981 | Spong | 430/945 |
| 4,345,261 | 8/1982 | Wilkinson | 430/945 |
| 4,719,613 | 1/1988 | Hirose et al. | 430/495 |
| 4,725,525 | 2/1988 | Kenney et al. | 430/495 |
| 4,913,949 | 4/1990 | Steininger et al. | 430/945 |
| 4,969,141 | 11/1990 | Takaoka et al. | 410/945 |
| 5,079,135 | 1/1992 | Matsuzawa et al. | 430/495 |
| 5,090,009 | 2/1992 | Hamada et al. | 369/284 |
| 5,153,873 | 10/1992 | Spruit et al. | 769/275.2 |
| 5,154,957 | 10/1992 | Yamada et al. | 430/945 |
| 5,189,922 | 2/1993 | Hayashida et al. | 430/495 |
| 5,292,592 | 3/1994 | Itoh | 369/288 |
| 5,315,573 | 5/1994 | Nakao et al. | 430/945 |

FOREIGN PATENT DOCUMENTS 60-10431 1/1985 Japan .

Primary Examiner—Charles L. Bowers, Jr.
Assistant Examiner—Martin J. Angebranndt
Attorney, Agent, or Firm—Hill, Steadman & Simpson

[57] ABSTRACT

An optical recording medium has a transparent substrate with a recorded pattern formed thereon and a saturable absorption dye containing layer disposed on the recorded pattern and containing at least a saturable absorption dye. The saturable absorption dye has a molecular extinction coefficient $\epsilon$ of $10^4$ or greater at the wavelength of reproducing light, and a relaxation time $\tau$ in the range of $1$ ns $\leq \tau \leq 100$ ns. A reflecting layer having a reflectivity of 70% or higher on an air boundary thereof may be disposed on the saturable absorption dye containing layer. The saturable absorption dye containing layer may have such a thickness that substantially minimizes the intensity of reflected light due to interference with respect to the intensity of the reproducing light. The saturable absorption dye may comprise a naphthalocyanine-based dye.

6 Claims, 15 Drawing Sheets

OPTICAL RECORDING MEDIUM

BACKGROUND OF THE INVENTION

1. Field of the Invention

The present invention relates to an optical recording medium, such as a so-called compact disk (CD) or the like and which is of such a system as to reproduce a signal by detecting a changed amount of a reflection of a reproduced light beam with radiating from a substrate side a reproducing light on recording patterns such as concavities and convexities corresponding to an information signal recorded on a transparent substrate or recorded pits recorded by the change of optical characteristics of the medium.

2. Description of the Related Art

Recently, in the field of information recording, researches concerning the optical information recording system have hitherto been advanced in various places. The optical information recording system has lots of advantages, such as to effect the recording and reproducing in a non-contact fashion, to achieve high recording density which is higher than that of the magnetic recording system by one figure, to be applicable to several memory types of read-only type, write-once type, rewritable type or the like. Therefore, this optical information recording system can realize an inexpensive large storage capacity file and a variety of uses from professional to consumer uses can be considered.

As the read-only type optical recording medium of the above-mentioned types, a digital audio disk (i.e., so-called compact disk, CD), an optical video disk (so-called laser disk, LD) or CD-ROM have already been widespread. In these optical recording media, a reflection layer made of a metal thin film such as an Al film or the like is deposited on the surface of a substrate having a layer in which concavities and convexities corresponding to an information signal or record patterns based on the change of optical characteristics of the medium are formed. A reproducing light such as a laser light or the like is radiated on the optical recording medium from the transparent substrate side and information is reproduced by detecting intensity of a reflected light.

In the optical recording medium of the above-mentioned read-only type, there is a demand that the recording density thereof is further improved in order to cope with digital VTRs, high-definition television receivers (HDTVs) or the like. Further, there is a demand that optical recording media are miniaturized in size in order to facilitate the operation thereof. From this standpoint, a further improvement of the recording density is requested.

As means for improving the recording density of the optical recording medium, it is considered to provide smaller recording pattern corresponding to information formed on the optical recording medium. If the recording pattern were made very small, then a spot diameter of a reproducing light that reproduces the optical recording medium would exceed a diffraction limit and the recording pattern would not be reproduced.

Therefore, in order to reduce the wavelength of the reproducing light, to compress a signal code or to improve the above-mentioned diffraction limit, there are considered various methods, such as increase of a numerical aperture (NA) of the optical system or the like. Of these methods, a super resolution receives a remarkable attention as a powerful means.

A principle of super resolution is such that a spot diameter of the radiated light is reduced to be smaller than the diffraction limit by setting an aperture smaller than the diffraction limit of the radiated light at object point position to thereby increase a resolution (e.g., "Charles W. McCutchenm "Super-resolution in Microscopy and the Abbe Resolution Limit." Journal of Optical Society of America, 57(10), 1190 (1967)", "Tony Wilson and Colin Shepard, "Theory and Practice of Scanning Optical Microscopy." Academic Press (London), 1984, etc.).

If such super resolution is applied to the optical recording medium, then the aperture must be moved as the reproducing light is moved on the optical recording medium. U.S. Pat. No. 5,153,873 described a technology that an aperture smaller than the diffraction-limited radiation spot) is formed within the reflection layer and resolution is improved by reducing the spot diameter of a reflected light reflected by the reflection layer.

In this previously-proposed method, as the optical response material, there is enumerated a non-linear optical material whose optical characteristic is directly changed by the reproducing light or a phase change material whose optical characteristic is changed by heat generated when the reproducing light absorbs a light. However, specific proper materials are not illustrated in the above-mentioned U.S. Pat. No. 5,153,873 and cannot be realized in actual practice.

Further, the assignee of the present application has previously proposed a method (now U.S. Pat. No. 5,018,119) in which super resolution effect is realized by reducing an area of a magnetic Kerr effect of a magneto-optical recording and reproducing system to be smaller than the spot diameter of the reproduced light thermally to thereby achieve the high density recording.

SUMMARY OF THE INVENTION

It is therefore an object of the present invention to provide an optical recording medium in which information of high recording density obtained by a recording pattern smaller than a diffraction-limited radiation spot of the reproduced light can be reproduced by super resolution.

It is another object of the present invention to provide an optical recording medium in which information of high recording density obtained by a recording pattern smaller than a diffraction-limited radiation spot of the reproduced light can be reproduced by super resolution and in which a reproduced signal is increased considerably.

To attain the aforesaid objects, the inventors et al. have studied vigorously optical response materials and found out that a saturable absorption dye should be used as the optical response material and that super resolution phenomenon can be realized by an absorption saturation phenomenon occurred when a light of an ex-saturable absorption dye is irradiated.

More specifically, according to the present invention, as shown in FIG. 1A, in an optical recording medium in which a recording pattern recorded on a transparent substrate as a change of optical characteristic such as concavities or convexities in response to an information signal is detected by the change of a reflection of a reproducing light which moves to scan the transparent substrate relatively to thereby reproduce a signal, a layer having at least a saturable absorption dye is formed on the recording pattern, a molecular extinction coefficient $\epsilon$ of the saturable absorption dye in the wavelength of the reproduced light is $10^4$ or greater, and a relaxation time $\tau$ thereof falls in a range of $1 \text{ ns} \leq \tau \leq 100 \text{ ns}$.

According to the present invention, in the optical recording medium, as shown in FIG. 1B, there may be sequentially formed a transparent substrate, a saturable absorption dye containing layer and a reflection layer of which the reflectivity on the air boundary is higher than 70%. Further, a thickness of the saturable absorption dye containing layer may be selected in such a manner as to minimize intensity of a reflected light due to interference relative to light intensity of a reproduced light.

Further, in the optical recording medium according to the present invention, the saturable absorption dye may be naphthalocyanine-based dye.

According to the present invention, as shown in FIG. 2 which is a schematic enlarged cross-sectional view showing an example thereof, between the substrate 1 an the saturable absorption dye containing layer 2 is formed a high (low) refractive index layer made of a material whose refractive index is relatively high (or low) as compared with those of the materials forming the substrate 2 and the saturable absorption dye containing layer 2.

Further, according to the present invention, on the substrate 1 are sequentially formed the high refractive index layer 3 and the saturable absorption dye containing layer 2 on which there is formed a reflecting layer 4 whose reflectivity on the air boundary is 70% or greater, in that order.

According to the present invention, in the above-mentioned structure, a real portion refractive index of the high refractive index layer 3 is selected to be 1.8 or greater.

Further, in the above-mentioned structure, the high refractive index layer 3 is formed of an inorganic ceramic material formed by a vacuum thin film forming method.

Furthermore, in the above-mentioned structure, the inorganic ceramic material is formed as a mixed film of ZnS and $SiO_2$.

In the optical recording medium according to the present invention, apertures smaller than diffraction limit of a reproduced light by changing a complex index of refraction at very small portion of the saturable absorption dye containing layer are formed with radiation of the reproducing light on the saturable absorption dye containing layer, thereby realizing super resolution phenomenon. In this case, the saturable absorption dye in the saturable absorption dye containing layer is changed from a ground state to an excited state in which a complex index of refraction is changed by the absorption of the reproduced light to form apertures. Then, the saturable absorption dye is returned to the ground state through the relaxation time $\tau$.

Therefore, if a molecular extinction coefficient $\epsilon$ of the saturable absorption dye used in the wavelength of the reproduced light is set to be $\epsilon<10^4$, then when the thickness of the saturable absorption dye containing layer is selected so as to substantially minimize the reflection intensity due to interference relative to the light intensity of the reproduced light, it is not possible to obtain a sufficient sensitivity. If the relaxation time $\tau$ of the saturable absorption dye in the wavelength of the reproduced light is set to be $\tau<1$ ns, then an aperture forming time is too short to obtain a sufficient sensitivity. If the relaxation time $\tau$ is set to be 100 ns $<\tau$, then the aperture forming time is so long that a shape of aperture becomes elliptical which is long in the scanning direction of the reproduced light. As a result, a resolution cannot be improved. Incidentally, if the relaxation time $\tau$ is set in a range of from 1 s to 10 ns, there can then achieved a larger effect.

The saturable absorption dye should preferably be dye which has a strong absorption in a laser wavelength region (750 to 810 nm) because a laser light is frequently used as a reproducing light. Further, the saturable absorption dye should preferably be such one that is stable from a thermal and photochemical standpoint. As such saturable absorption dye, there are enumerated cyanine-based dye, a phthalocyanine-based dye and naphthalocyanine-based dye. For example, there can be enumerated dyes produced by EXCITON corporation (U.S.A.) under the trade names of DTTC, HITC, IR-125, IR-140, IR-144 or the like. In particular, naphthalocyanine-based dye should be preferable because it has a large molecular absorption coefficient and a high optical stability.

According to the present invention, there is provided the optical recording medium in which the recorded pattern recorded on the transparent substrate as concavities and convexities or the change of the optical characteristics relative to the information signal is detected by the change of reflection of the reproducing light which is perpendicularly introduced from the transparent substrate side and moves to scan the transparent substrate relatively to thereby reproduce a signal. In this optical recording medium, one layer containing at least the saturable absorption dye is formed on the recording pattern and the molecular absorption coefficient $\epsilon$ of the saturable absorption coefficient in the wavelength of the reproduced light is $10^4$ or greater. Also, the relaxation time $\tau$ thereof is set in a range of from 1 ns $\leq\tau\leq$ 100 ns. Therefore, it is possible to reproduce very small recording patterns smaller than the diffraction limit of the reproduced light.

Further, according to the structure shown in FIG. 2, there is provided the saturable absorption dye containing layer 2 whose absorptivity is large at normal temperature, i.e., under the state that the reproducing light is not irradiated thereon and whose portion radiated with a light of constant light amount or more is set in the saturable absorption state to make the absorptivity become zero. Therefore, if a reproducing light is radiated on this optical recording medium, areas in which the absorptivity of the saturable absorption dye containing layer 2 becomes zero, i.e., a reflected light can be obtained sufficiently are formed in the spot of the reproduced light.

In particular, if the molecular absorption coefficient $\epsilon$ and the relaxation time $\tau$ of the saturable absorption dye are selected as described above, even when recording patterns such as a plurality of recording pits or the like are provided within the beam spot, it is possible to obtain a reflected light by placing only very small areas corresponding to the recording patterns in the saturable state, thus reproduction with super resolution becomes possible.

Accordingly, without modifying a reproducing apparatus with a considerably large modification, such as reducing a wavelength of a reproduced light, using a focusing lens having a large NA (numerical aperture) or changing a signal demodulation system or the like, information amount about four times as large as the present one can be stored in an optical recording medium of about the same size as that of the present optical recording medium.

As a result of vigorous study and research of the inventor et al. of the present application, it became clear that, particularly in this optical recording medium, if a Fresnel reflection is increased by forming a film having a refractive index higher (or lower) than those of the substrate 1 and the dye containing layer 2 between the transparent substrate 1 and the saturable absorption dye containing layer 2 and a resonator structure which confines a light is formed within the dye containing layer 2, then intensity of a reproduced signal can be increased considerably.

A principle thereof will be describe below in brief.

As shown in FIG. 2, by inserting the high refractive index layer or low refractive index layer into a super resolution reproducing disk formed of a substrate/saturable absorption dye containing layer/reflection layer, it is possible to increase an amount of light which does not travel the saturable absorption dye containing layer but is reflected on the surface thereof and then returned.

FIGS. 3A and 3B show conceptual diagrams of the state at that time. A reflected light RA is a result obtained when a light amplitude AR2 which does not travel back and forth in the saturable absorption dye containing layer 2 but is reflected on the surface thereof, and a light amplitude AR1 which is returned after it traveled back and forth in the saturable absorption dye containing layer 2 interfere with each other. The light amplitude AR2 doe not pass through the saturable absorption dye containing layer 2 so that its beam profile becomes exactly the same as that of the incident light. On the other hand, because the light amplitude AR1 traveled back and forth in the saturable absorption dye containing layer 2, the amplitude at the peripheral portion thereof is relatively lowered as compared with the center of the beam and has therefore a beam profile which is sharpened more.

If these lights have relative amplitude intensities in which the light amplitude AR1 is large at the central portion and the light amplitude AR2 is large at the peripheral portion, then areas in which the light amplitudes AR1 and AR2 become exactly equal to each other exist in an annular fashion. If the light amplitudes AR1 and AR2 are displaced from each other by a half wavelength, then a reflection intensity of such portion becomes zero due to interference.

Further, if such optical recording medium is formed by sequentially forming the transparent substrate 1, the high (or low) refractive index layer 3, the saturable absorption dye containing layer 2 and the reflection layer 4 whose reflectivity on the air boundary is 70% or higher, then information can be reproduced from the optical recording medium stably and reliably.

Further, if the real portion refractive index of the above-mentioned high refractive index layer is selected to be 1.8 or greater, then the above-mentioned resonator structure can be formed reliably and therefore intensity of the reproduced signal can be improved sufficiently.

Furthermore, if the above-mentioned high refractive index layer is made of an inorganic ceramic material formed by the vacuum thin film forming method, then a heat-resisting property can be improved. Also, the manufacturing process thereof can be simplified and a film forming property thereof can be improved.

In addition, if the mixed film of ZnS and $SiO_2$ is used as the inorganic ceramic material, when the optical recording medium according to the present invention is applied to a so-called compact disc (CD) in which recording pits are formed by concavities and convexities, there can be obtained a relatively large reproduced output of 40 dB or greater.

DESCRIPTION OF THE PREFERRED EMBODIMENTS

Figure 1A:
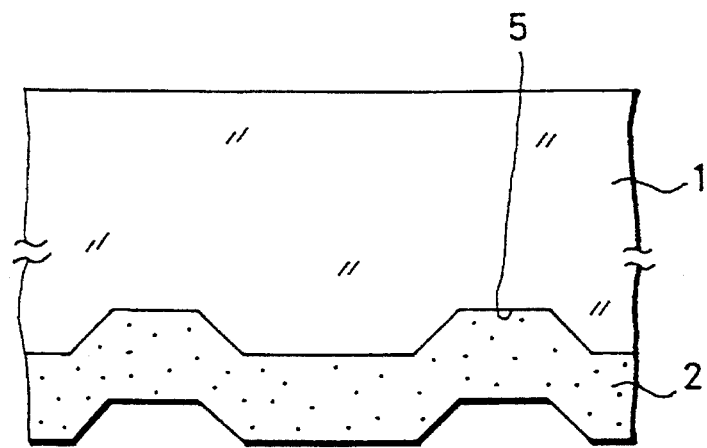
FIGS. 1A and 1B are schematic diagrams showing structures of optical recording media according to the present invention, respectively.

Specific embodiments to which the present invention is applied will be described hereinafter on the basis of experimental results. Prior to describing the embodiments of the invention, a super resolution achieved by the saturable absorption phenomenon will be described from a theory standpoint.

More specifically, the saturable absorption phenomenon in the saturable absorption dye containing layer in the optical recording medium in which the saturable absorption dye containing layer and the reflecting layer are sequentially formed on the transparent substrate was obtained from a simple velocity equation, a transmittance of a reproduced light relative to the reflecting film was calculated to thereby obtain a distribution of a reflectivity of the optical recording medium and a beam profile of the reflected light under the condition that the reproducing light was moving on the optical recording medium. Initially, the velocity equation of the saturable absorption phenomenon of the saturable absorption dye containing layer will be described below. Let it be assumed that the saturable absorption dye is set in the excited state from the ground state when it absorbs a light and then returned to the ground state through the relaxation time $\tau$. Then, considering the change of a molecularity G in the ground state at the unit area (cm$^{-2}$), the molecularity G in the ground state is expressed by the following equation (1):

$$\frac{dG(t)}{dt} = -\frac{\lambda IA}{hc} + \frac{N - G(t)}{\tau} \quad (1)$$

where N is the total molecularity, A is the absorptivity, I is the reproduced light intensity, $\lambda$ is the reproduced light wavelength, c is the speed of light, and h is the Planck's constant. Incidentally, it is determined that the saturable dye does not absorb light at all in its excited state.

At that time, the above absorptivity A is determined by a linear attenuation coefficient k (imaginary number component of complex refractive index) of the saturable absorption dye containing layer, the structure and thickness of the film and the optical constant. Incidentally, the above linear attenuation coefficient k is expressed by the molecularity G, the film thickness d and the molecular absorption constant $\epsilon$ as in the following equation (2) (in the equation (2), NA represents Avogadro's number):

$$k = \frac{2.303 \epsilon \lambda G}{4\pi N_A d} \quad (2)$$

Then, a relationship between the absorptivity A and the linear attenuation coefficient k was obtained by the calculation of the reflectivity of the multilayer film. In the multilayer film system, this relationship was calculated by the equation provided under the regular reflection condition relative to the multilayer on the basis of the structures, thickness and complex refractive indexes of these films. In the above-mentioned multilayer, if a film thickness of each film is taken as dj and a complex refractive index of each film is taken as ncj (=nj−ikj), then a reflectivity R, a transmittance T and an absorptivity A are respectively expressed by the following equations (3), (4) and (5):

$$R = |a_{21}/a_{11}|^2 \quad (3),$$

$$T = |1/a_{22}|^2 (n_n/n_1) \quad (4),$$

$$A = 1 - R - T \quad (5).$$

At that time, all, a12, a21, a22 tj-1, sj and $\delta j$ are expressed as in the equations (6), (7), (8) and (9). In this case, all, a12, a21 and a2 represent respective components of propagation matrixes of the multilayer film system, tj represents a transmittance coefficient at the boundary between jth and j+1th layers, sj represents (reflection coefficient/transmittance coefficient) on the same boundary surface and $\delta j$ represents the phase displacement across a jth layer:

$$\begin{bmatrix} a_{11}, a_{12} \\ a_{21}, a_{22} \end{bmatrix} = \begin{bmatrix} t_1^{-1}, & s_1 \\ s_1, & t_1^{-1} \end{bmatrix} \prod_{j=2}^{m-1} \begin{bmatrix} t_j^{-1} \exp(i\delta_j), & s_j \exp(i\delta_j) \\ s_j \exp(-i\delta_j), & t_j^{-1} \exp(-i\delta_i) \end{bmatrix}, \quad (6)$$

$$t_j^{-1} = (n^c_j + n^c_{j+1})/2n^c_j \quad (7),$$

$$s_j = \gamma_j/t_j = (n^c_j + 1)2n^c_j \quad (8),$$

$$\delta_j = 2\pi n^c_j d_j/\lambda \quad (9).$$

In this fashion, a relationship between absorptivity and the linear attenuation coefficient k was obtained. If the molecularity of the saturable absorption dye which is in the ground state within the saturable absorption dye containing layer is changed, then due to a Kramers-Kronig relationship, not only the imaginary part but also the real part of the complex refractive index is changed. In this case, it is considered that the dye is dispersed thinly and therefore the change of the real part refractive index was neglected in the calculation of that time.

Figure 1B:
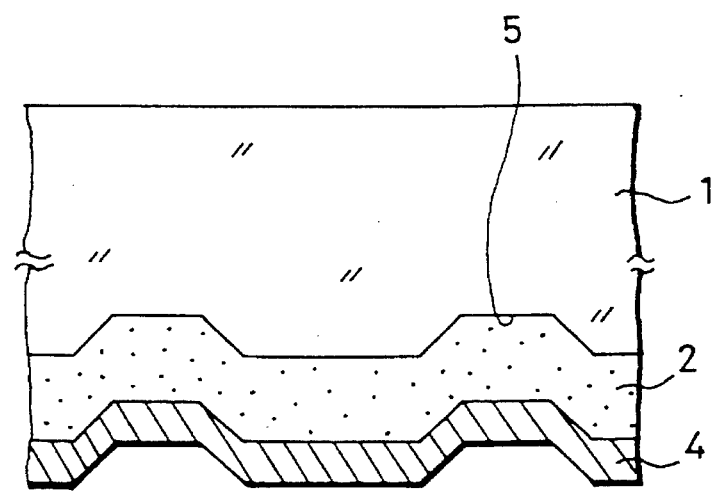

Accordingly, the practical reflectivity distribution of the optical recording medium and the beam practical profile of the reflected light were obtained by using the above-mentioned equations. As the optical recording medium having the high refractive index layer, there was assumed such one that the transparent substrate 1 made of glass has formed thereon the saturable absorption dye containing layer 2 made of the saturable absorption dye and the binder on which the reflection layer 3 made by evaporating the aluminum is formed as shown in FIG. 1. The complex refractive indexes of the transparent substrate and the reflection film were assumed to be 1.5-i0 and 1.9-i7, respectively. The thickness of the saturable absorption dye containing layer was assumed to be such one that the reflectivity becomes zero in the initial state (output of the reproduced light is zero) or that substantially minimizes the reflected light intensity produced by the interference relative to the light intensity of the reproduced light under the condition that a reproduced light of a small output is irradiated, i.e., such one that the phase of the reflected light from the saturable absorption dye containing layer/transparent substrate boundary surface and the phase of the saturable absorption dye containing layer/ reflection film boundary surface are displaced from each other by 180°, i.e., the thickness of the saturable absorption dye containing layer satisfies a s-called non-reflection condition. The complex refractive index thereof was assumed to be 1.5-i0.3 and the film thickness thereof was assumed to be 180 nm.

Figure 5:
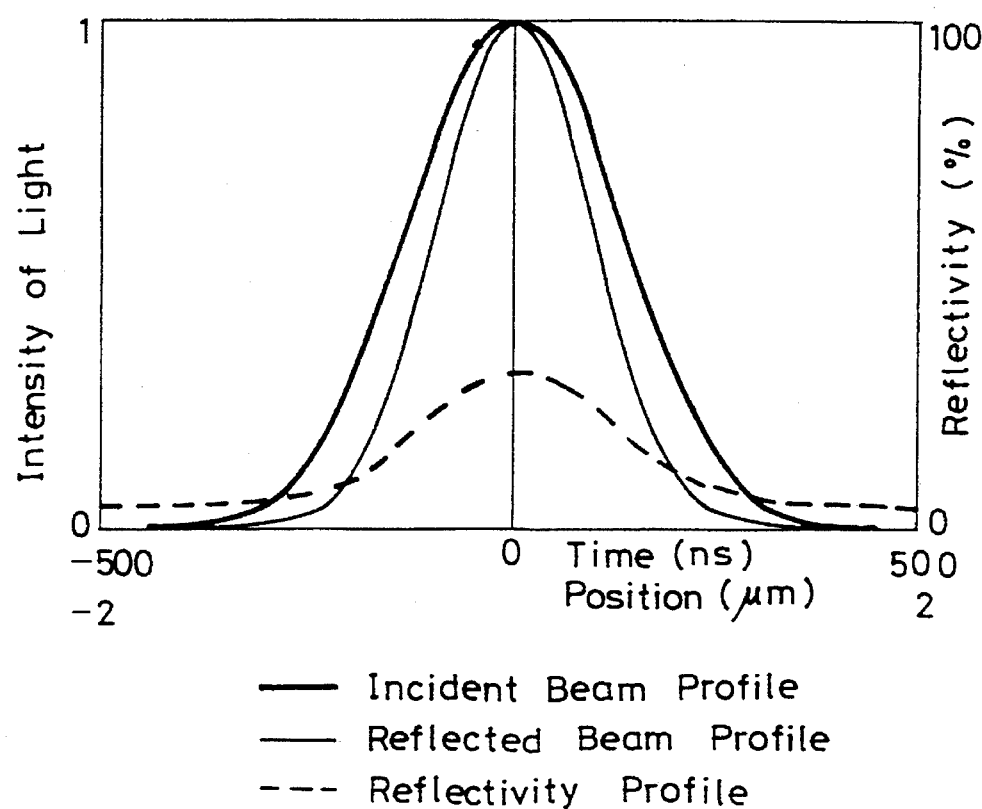
FIG. 5 is a diagram showing an example of a calculated distribution of refractive indexes of an optical recording medium and calculated beam profiles of reproducing and reflected light applied to and reflected by the optical recording medium.

FIG. 5 shows calculated results obtained in the above optical recording medium when molecular absorption constant $\epsilon$ of the saturable absorption dye was assumed to be 5×10$^5$, the relaxation time $\tau$ was assumed to be 5 ns, the rotation linear velocity v of the optical recording medium was assumed to be 4 m/s, the spot diameter of the reproduced light was assumed to be 2 μm, the laser light was assumed as the reproduced light, the wavelength of the laser light was assumed to be 780 nm, and the output power thereof was assumed to be 1 mW, respectively. Although the initial reflectivity of this optical recording medium was 5%, it became clear that, if the above-mentioned reproduced light was irradiated thereon, a reflectivity shown by a solid line in FIG. 5 was increased to 25% in the center of the beam spot of the reproduced light. Then, it can be understood that the super resolution occurred in which the laser beam diameter at 1/e2 of the peak power was 73% of the incident light.

Figure 6:
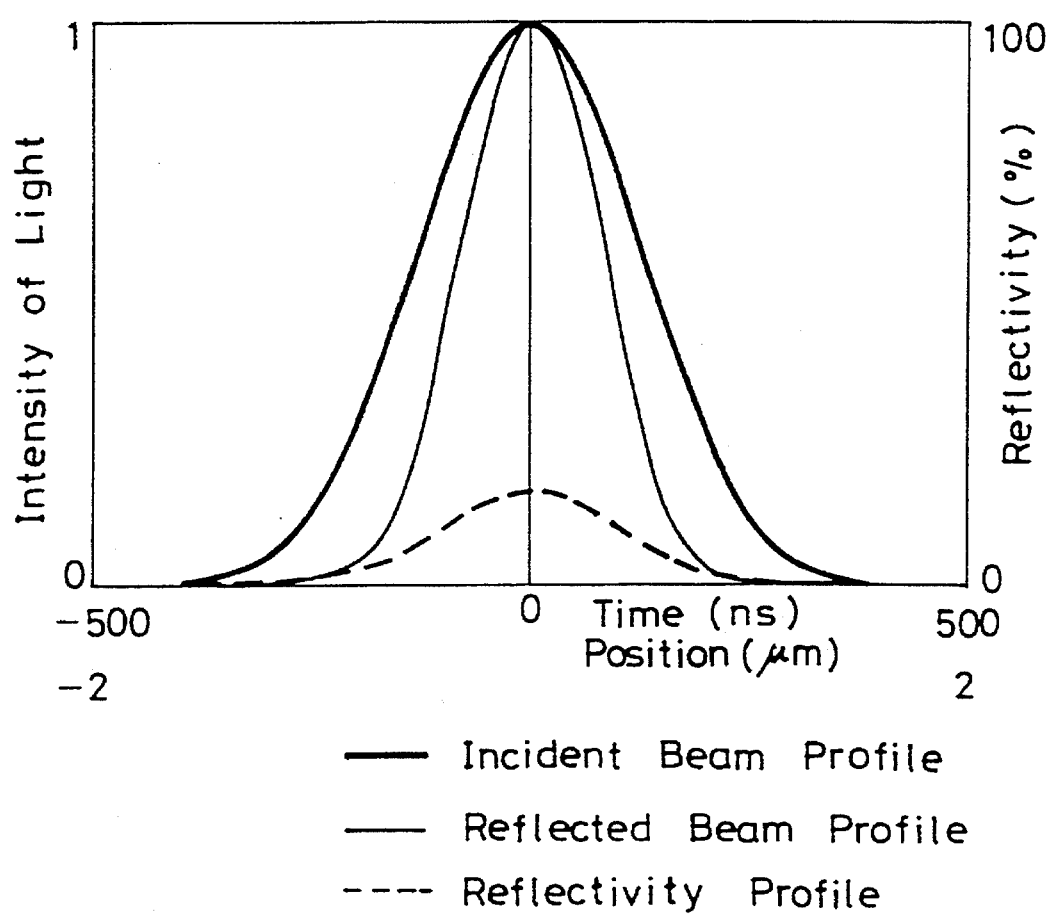
FIG. 6 is a diagram showing another example of a calculated distribution of refractive indexes of an optical recording medium and calculated beam profiles of reproducing and reflected light applied to and reflected by the optical recording medium.

In this case, in order to examine the insertion effect of the high refractive index layer, let us consider the case that a film having a refractive index of 1.8-i0 and whose film thickness is 110 nm which is ¼ wavelength of the reproduced laser wavelength. FIG. 6 shows calculated results obtained under the similar reproduction conditions. Study of FIG. 6 reveals that, at that time, the reflectivity as increased from 0.5% to 18% at the center of the laser beam. Also, study of FIG. 6 reveals that stronger super resolution occurred in which the laser beam diameter at 1/e2 of the peak power occupies 63% of the incident light.

Figure 7:
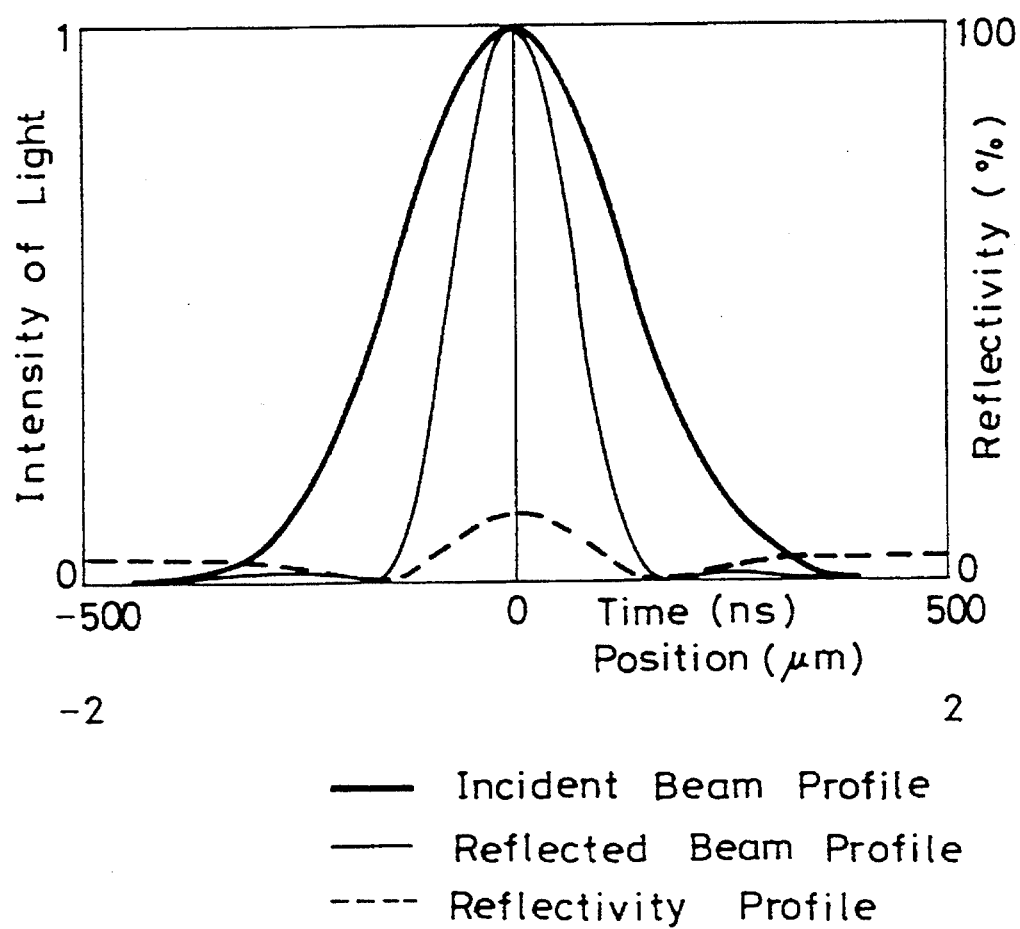
FIG. 7 is a diagram showing still another example of a calculated distribution of refractive indexes of an optical recording medium and calculated beam profiles of reproducing and reflected light applied to and reflected by the optical recording medium.

Subsequently, in order to examine the insertion effect of a layer with a higher refractive index, let us consider the case that a film having a refractive index of 2.3-i0 and whose film thickness is 85 nm which is ¼ wavelength of the reproduced laser wavelength. FIG. 7 shows calculated results obtained under similar conditions (laser power was increased 50%). Study of FIG. 7 reveals that, at that time, the reflectivity was increased from 3.5% to 13% at the center of the laser beam. Also, study of FIG. 7 reveals that stronger super resolution occurred in which the laser beam diameter at 1/e2 of the peak power occupies 48% of the incident light.

At that time, the beam profile of the reflected laser beam became zero. The reason for this is that the amplitude of the light that traveled back and forth the dye and that of the light reflected on the surface of the dye are equal to each other with the result that the beam profile becomes zero due to interference.

Incidentally, it is clear that, even when a layer to be inserted is a low refractive index layer, the super resolution becomes strong as the refractive index difference becomes large similarly to the case that the high refractive index layer is inserted. Therefore, specific simulated numerical values need not be described.

EXPERIMENTAL EXAMPLE 1

In this experimental example, an optical recording medium was manufactured in actual practice, and how the reflectivity was changed when a reproducing light was radiated on the optical recording medium was investigated.

Initially, a complex refractive index of the saturable absorption dye containing layer was measured. Bis (tri-n-hexylsiloxy) silicon naphthalocyanine (hereinafter simply referred to as SINC) was used as a saturable absorption dye, and a polymethylacrylate (hereinafter simply referred to as PMMA) having a molecular weight of 400000 was used as a binder. The SINC and the PMMA were dissolved into chloroform and coated on a glass substrate serving as a transparent substrate by a spin coating method. Then, saturable absorption dye containing layers while the film thicknesses thereof were being changed in a range of from 100 to 200 nm. A mixing ratio of the SINC, the PMMA and chloroform was 2:15:500. When these were mixed, PMMA was perfectly dissolved by stirring and heating for several hours and SINC also was perfectly dissolved by stirring with an ultrasonic cleaner. Chemical structures of SINC and PMMA are shown by the following chemical formulas (1) and (2):

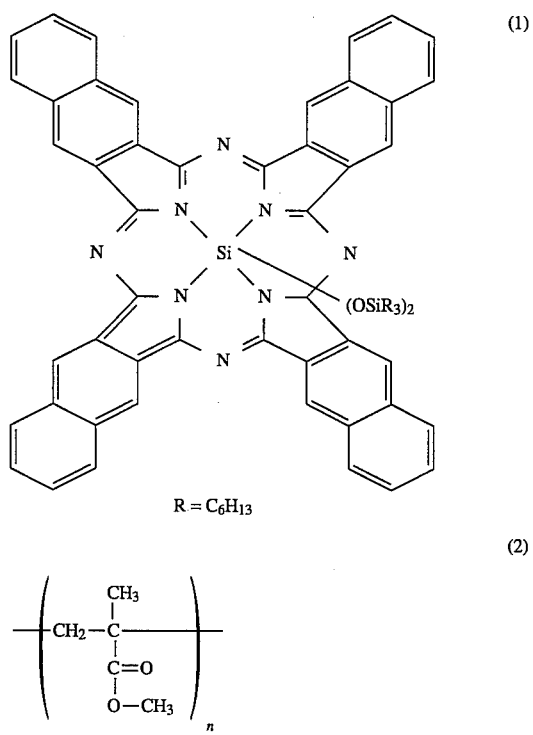

Figure 8:
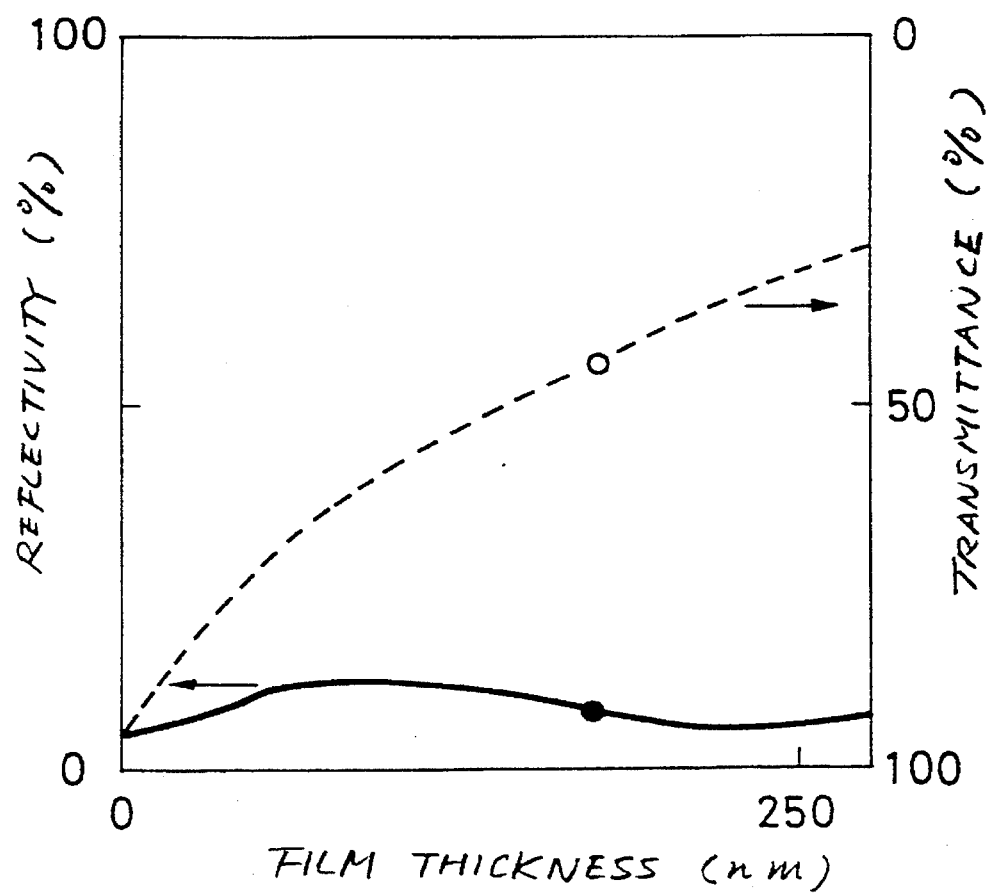
FIG. 8 is a graph showing transmittances and reflectivities of saturable absorption dye containing layers used in EXPERIMENTAL EXAMPLE 2 at various film thicknesses thereof.

Transmittances and reflectivities of the saturable absorption dye containing layers thus obtained were measured, and measured results are illustrated in FIG. 8. In FIG. 8, an open circle represents a measured transmittance of the saturable absorption dye containing layer having a thickness of 170 nm, and a solid circle represents a measured reflectivity. In FIG. 8, a dashed line and a solid line represent measured transmittance and reflectivity of the optical recording medium having he complex refractive index of 1.7-i0.3 . Study of FIG. 8 reveals that the measured results shown by the open circle and the solid circle and the transmittance and the reflectivity of the optical recording medium having the complex refractive index of 1.7-i0-.3 shown by the solid and dashed lines are well coincident. Thus, it can be judged that a complex refractive index of the measured saturable absorption dye containing layer is 1.7-i0.3.

Subsequently, an optical recording medium was manufactured by using a transparent substrate in which a film thickness of the saturable absorption dye containing layer was 170 nm. More specifically, a reflection film formed of an aluminum evaporation film was formed on the saturable absorption dye containing layer formed on the transparent substrate. In that case, as an evaporating apparatus, there was used such one that was manufactured by NICHIDEN ANERVA CORP. under the trade name of EVD-500A. Then, the evaporation was carried out by an ordinary method under the condition that a vacuum degree was $3\times10^{-4}$ Pa and an evaporation rate was about 2 nm/s. A film thickness was selected to be 400 nm and this film thickness was measured and confirmed by a film thickness meter based on quartz oscillation.

Figure 9:
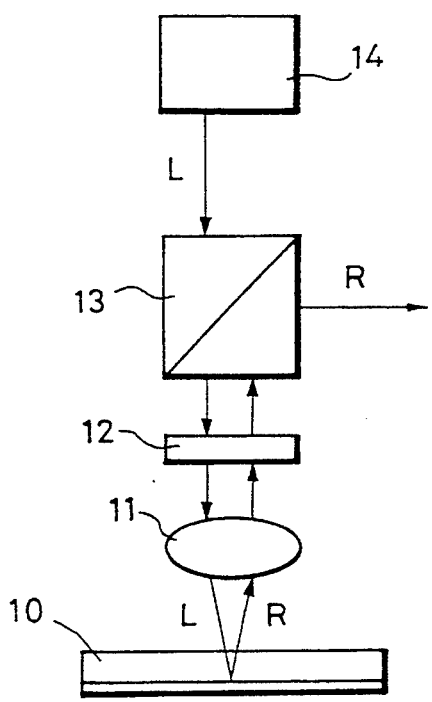
FIG. 9 is a schematic view of an optical system for measuring the reflectivity of an optical recording medium.

Then, a reflectivity of the above-mentioned optical recording medium was measured by an optical system shown in FIG. 9. As shown in FIG. 9, this optical system is comprised of a semiconductor laser (LD) 14 serving as a reproducing light source, a polarizing beam splitter (PBS) 13 for splitting a reproducing light and a reflected light, a quarter wave plate (Qup) 12, and a focusing lens 11. A reproducing light, which is shown by an arrow L in FIG. 9, is emitted from the semiconductor laser (LD) 14 and traveled through the polarizing beam splitter (PBS) 13, the quarter wave plate (Qup) 12 and the focusing lens 11 to radiate an optical recording medium 10. The reproducing light that was radiated on the optical recording medium 10 travels through the focusing leans 11 and the quarter wave plate (Qup) 12 as a reflected light shown by an arrow R in FIG. 9 and splitted by the reproducing light L with the polarizing beam splitter (PBS) 13, thereby being detected. The optical recording medium 10 is set on a rotating disk, not shown, and can be rotated. Then, a reflectivity was measured under the condition that a rotational linear velocity of the optical recording medium 10 was selected to be 1.5 to 4.5 m/s, the wavelength of the reproducing light was selected to be 780 nm which falls in a laser wavelength region, an output power of the reproducing light required when the reproducing light radiates the optical recording medium 10 was selected in a range of from 1 to 10 mW and that an NA of the focusing lens 11 was selected to be 0.4.

As a result, it was observed that a reflected light intensity on the optical recording medium 10 at its extremely small portion which corresponds to the focused position of the reproducing light is increased as the output power of the reproducing light is increased. In that case, it was confirmed that the reflectivity was increased while the intensity of the reproducing light was not changed.

Figure 10:
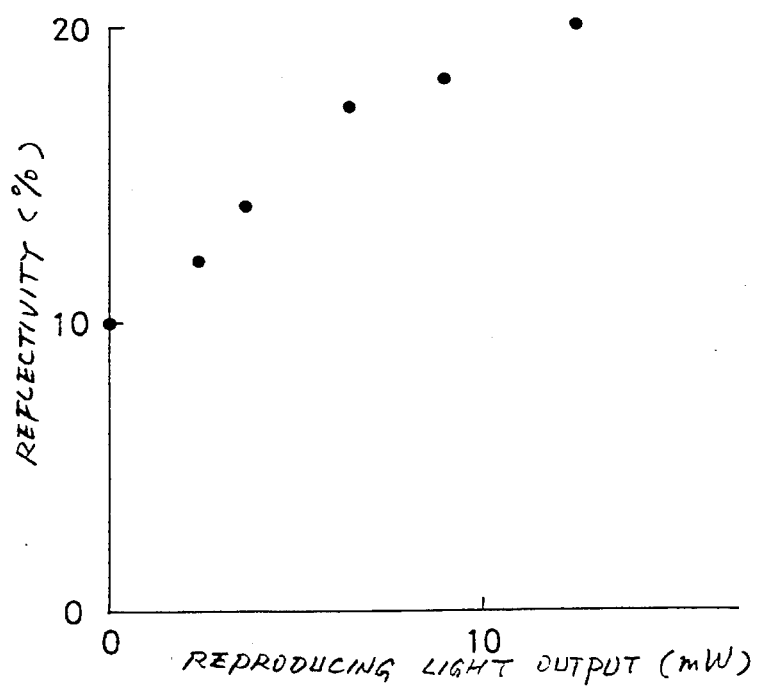
FIG. 10 is a graph showing the relationship between the output of reproducing light and the reflectivity in the position where the reproducing light is focused.

FIG. 10 shows measured results of the output power of the reproducing light and the change of the reflectivity at the focused position of the reproducing light. It was confirmed from measured results of FIG. 10 that the reflectivity was changed with the change of the output level of the reproducing light. Also, as the output level of the reproducing light is changed in a range of from 0 to 10 mW, the reflectivity is changed from 10% to 20%. This seems to be achieved by the saturable absorption effect of the saturable absorption dye containing layer.

Figure 11:
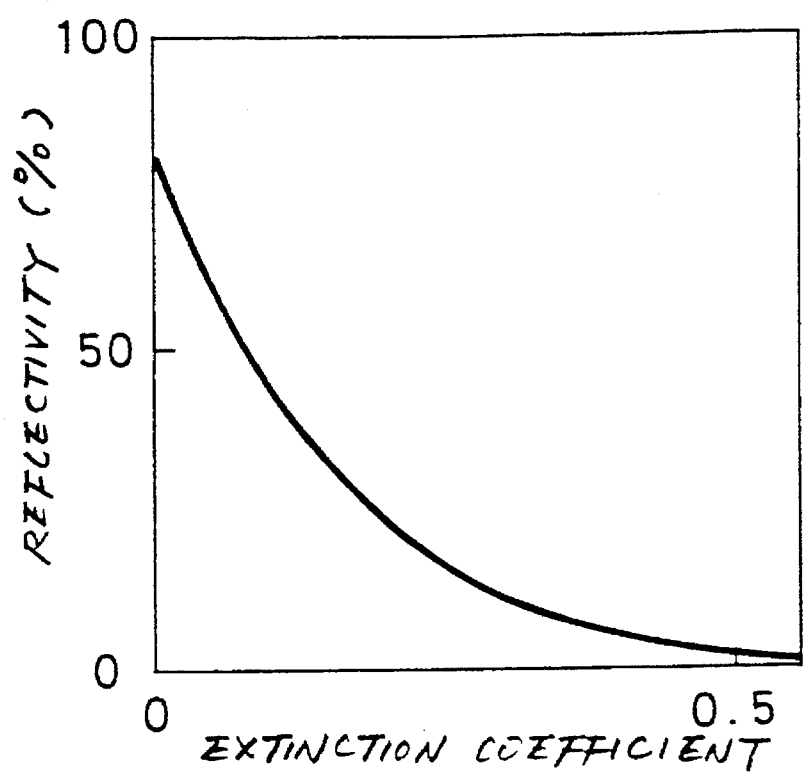
FIG. 11 is a graph showing the reflectivity as it varies when the linear attenuation coefficient of the saturable absorption dye containing layer varies.

FIG. 11 shows measured results of the change of reflectivity obtained when the linear attenuation coefficient of the saturable absorption dye containing layer of the optical recording medium was changed. In the optical recording medium according to this experimental example, it was confirmed that the linear attenuation coefficient k of the saturable absorption dye containing layer was 0.3. Study of measured results of FIG. 11 reveals that the reflectivity was improved from 10% to 20% because the linear attenuation coefficient k was lowered to 0.2 with the radiation of the reproducing light. Therefore, it is concluded that the change of the reflectivity in the above optical recording medium was caused when the complex refractive index of the saturable absorption dye containing layer was changed by the saturable absorption effect of the saturable absorption dye containing layer.

EXPERIMENTAL EXAMPLE 2

In this experimental example, very fine recording patterns which are under the diffraction limit of the reproducing light were formed on the practical optical recording medium and then reproduced by super resolution.

Initially, test samples were produced. Although recording patterns are formed on the transparent substrate at a cycle of 1 μm/bit on the ordinary optical recording medium, in the optical recording medium according to this experimental example, recording patterns were formed on a transparent substrate (glass 2P disk substrate having a diameter of 120 mm) at a cycle of 0.3 μm/bit, i.e., at a cycle of 0.6 μm for super resolution on which a saturable absorption dye containing layer and a reflecting layer are formed sequentially.

The above saturable absorption dye containing layer was formed on the transparent substrate by using the SINC as the saturable absorption dye similarly to the experimental example 1, the PMMA as the binder similarly to the experimental example 1 and cyclohexanone as a solvent according to the spin coat method. When these were mixed, PMMA of 1.31 g and cyclohexanone of 38.7 g were heated, stirred and mixed, whereafter SINC of 0.262 g was added thereto and dispersed, heated and then mixed by using the ultrasonic cleaner. A weight ratio of SINC and PMMA was 1:5. When the above product was coated on the transparent substrate, it was coated on the transparent substrate by using a spin coater made by MIKASA CORP. at maximum rotational speed ranging from 2000 to 2400 r.p.m. Thereafter, the product was left in the vacuum state at ambient temperature of 80° C. for 2 hours in order to dry the solvent.

Figure 12:
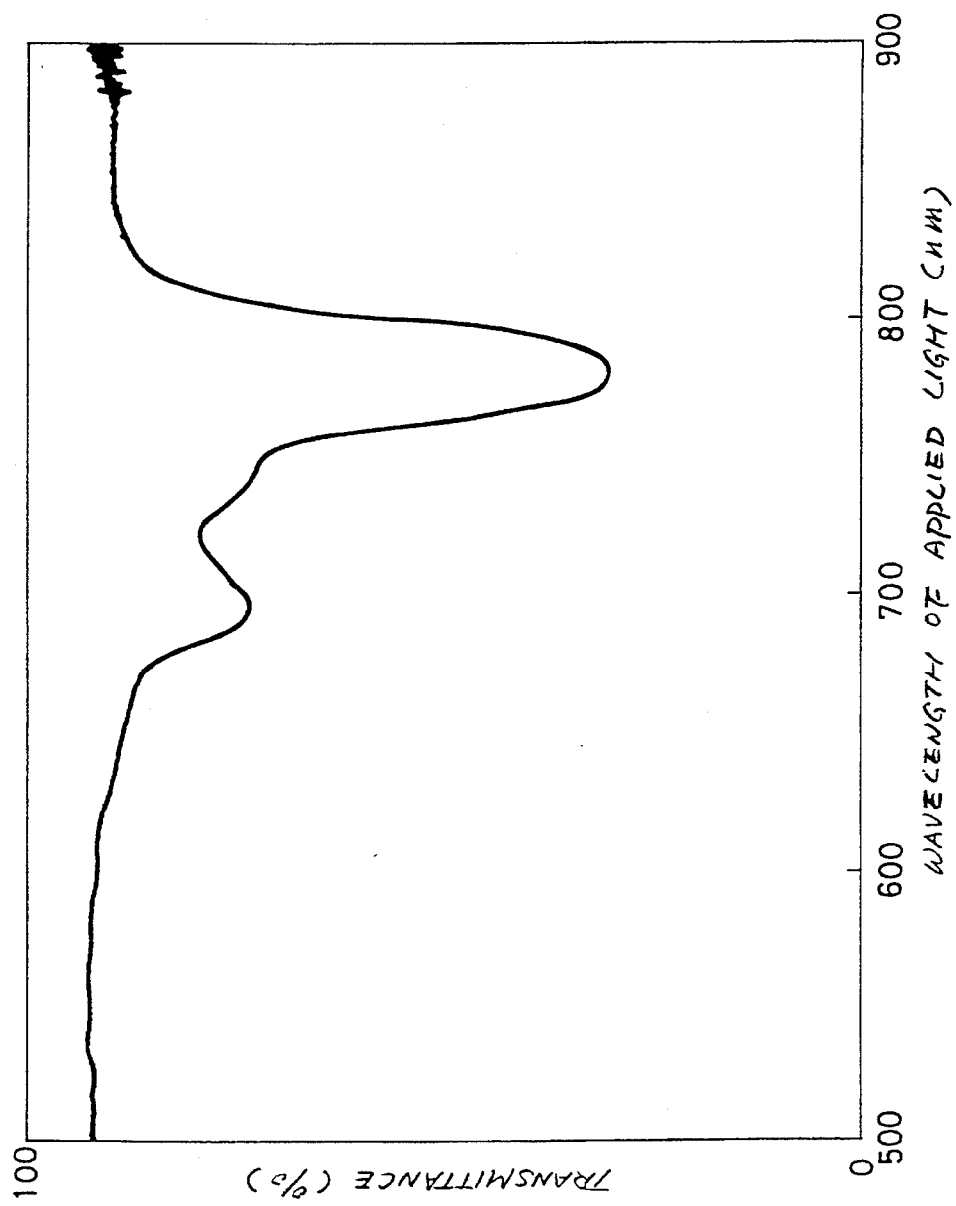
FIG. 12 is a graph showing a spectrum of transmittances of a substrate combined with a saturable absorption dye containing layer used in EXPERIMENTAL EXAMPLE 3.

A film thickness of the saturable absorption dye containing layer thus obtained was about 150 nm. FIG. 12 shows a measured transmission spectrum of the substrate on which the above saturable absorption dye containing layer was formed. Study of FIG. 12 reveals that a transmittance obtained when the wavelength of the radiated light was 780 nm in the laser wavelength region was 30%.

Figure 13:
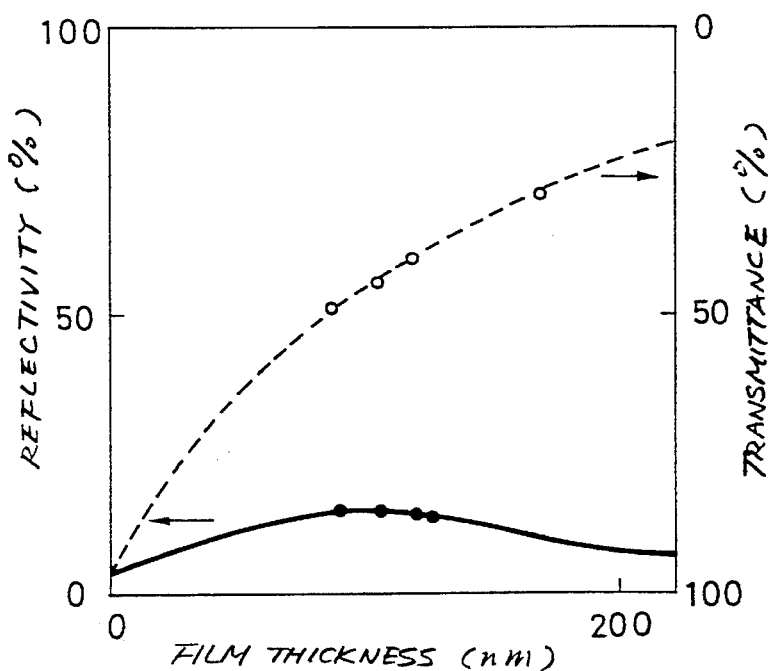
FIG. 13 is a graph showing transmittances and reflectivities of saturable absorption dye containing layers used in EXPERIMENTAL EXAMPLE 3 at various film thicknesses thereof.

FIG. 13 shows a relationship among the film thickness, transmittance and reflectivity of the saturable absorption dye containing layer obtained when the above saturable absorption dye containing layer was formed on a flat glass substrate. In FIG. 13, an open circle represents a transmittance of the saturable absorption dye containing layer, a solid circle represents a reflectivity thereof, and a dashed line and a solid line represent a transmittance and reflectivity of the optical recording medium having a complex refractive index of 1.7-i0.45. From the measured results of FIG. 13, it is clear that the measured results shown by the open and solid circles and the transmittance and the reflectivity of the optical recording medium having the complex refractive index as shown by the dashed line and the solid line are well coincident. Therefore, it can be judged that a complex refractive index of the measured saturable absorption dye containing layer is 1.7-i0.45.

Subsequently, an Au thin film was formed on a saturable absorption dye containing layer having a film thickness of 150 nm formed on a transparent substrate on which super resolution recording patterns were formed as a reflection film by a vacuum evaporation method. A vacuum evaporation apparatus made by SHOWA VACUUM CORP. was used as a vacuum evaporation apparatus and an evaporation was carried out by an ordinary method at a vacuum degree of $3 \times 10^{-4}$ Pa and an evaporation rate of 0.4 nm/s. A thickness of the reflection film was 80 nm.

Subsequently, a signal was reproduced from the optical recording medium thus manufactured. As described before, in the optical recording medium according to this experimental example, a signal of 0.3 μm/bit was recorded thereon as a super resolution recording pattern. This recording pattern is a signal which is smaller as compared with a diffraction limit of the reproducing light. Therefore, unless the super resolution phenomenon occurs, such recording pattern cannot be reproduced.

Figure 14:
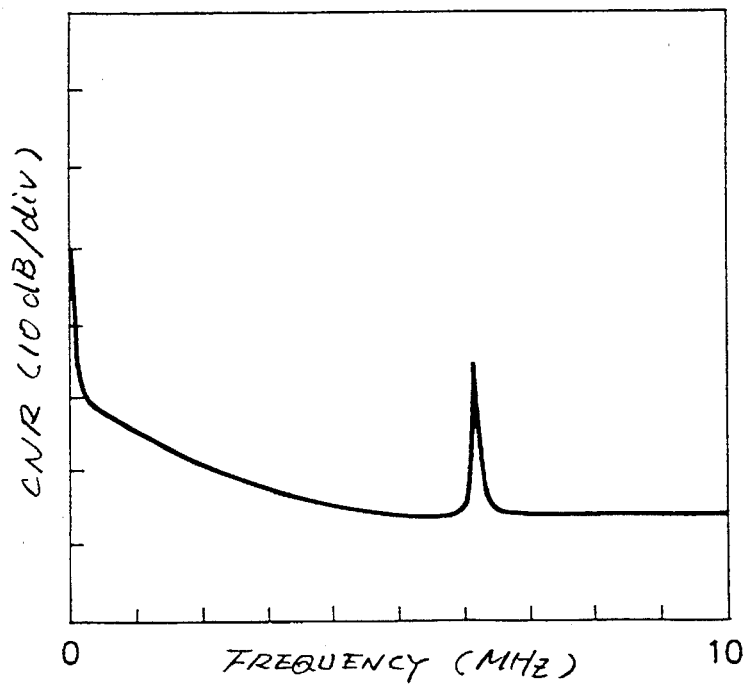
FIG. 14 is a diagram showing a reproduced signal from an optical recording medium used in EXPERIMENTAL EXAMPLE 3.

Accordingly, the recording pattern was reproduced under the condition that the rotational linear velocity of the optical recording medium was set to 3.7 m/s, the wavelength of the reproducing light was set to 780 nm of the laser wavelength region, and the NA of the focusing lens was set to 0.53 while the output power of the reproducing light was changed in a range of from 1 mW to 10 mW. A spatial cut-off cycle (2 NA/λ) of a modulation transfer function (MTF) of this optical system is 0.74 μm and therefore a signal of 0.3 μm/bit, i.e., 0.6 μm cycle cannot be read out by an ordinary method. As a consequence, when the output power of the reproducing light was 1 mW, a slight reproduced signal could be obtained. When the output power of the reproducing light was 2.5 mW, as shown in FIG. 14, a signal having a frequency of 6 MHz could be obtained at CNR=19.4 dB. Thereafter, the signal was similarly reproduced under the condition that the rotational linear velocity of the optical recording medium was selected to be 10 m/s. When the output power of the reproducing light was 4 mW, a signal having a frequency of 6 MHz was obtained at CNR=18 dB. The above-mentioned signal reproduction experiments have reproducibility of 1000 times or more and it could be understood that the optical recording medium according to this experimental example was very stable.

EXPERIMENTAL EXAMPLE 3

This experimental examples shows that the present invention is applied to a so-called compact disc in which recording information is formed by concavities and convexities.

Figure 2:
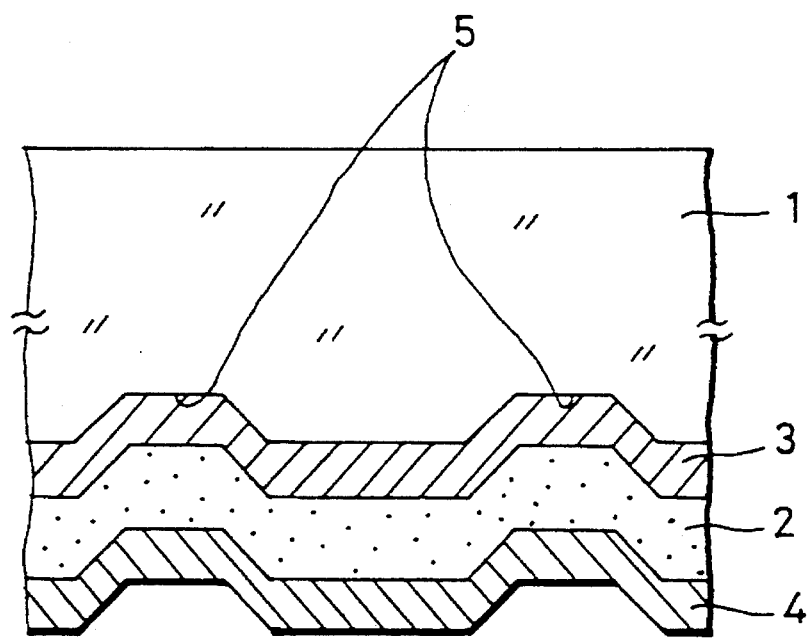
FIG. 2 is a schematic cross-sectional view showing a main portion of an optical recording medium according to the present invention in an enlarged scale.
Figure 3B:
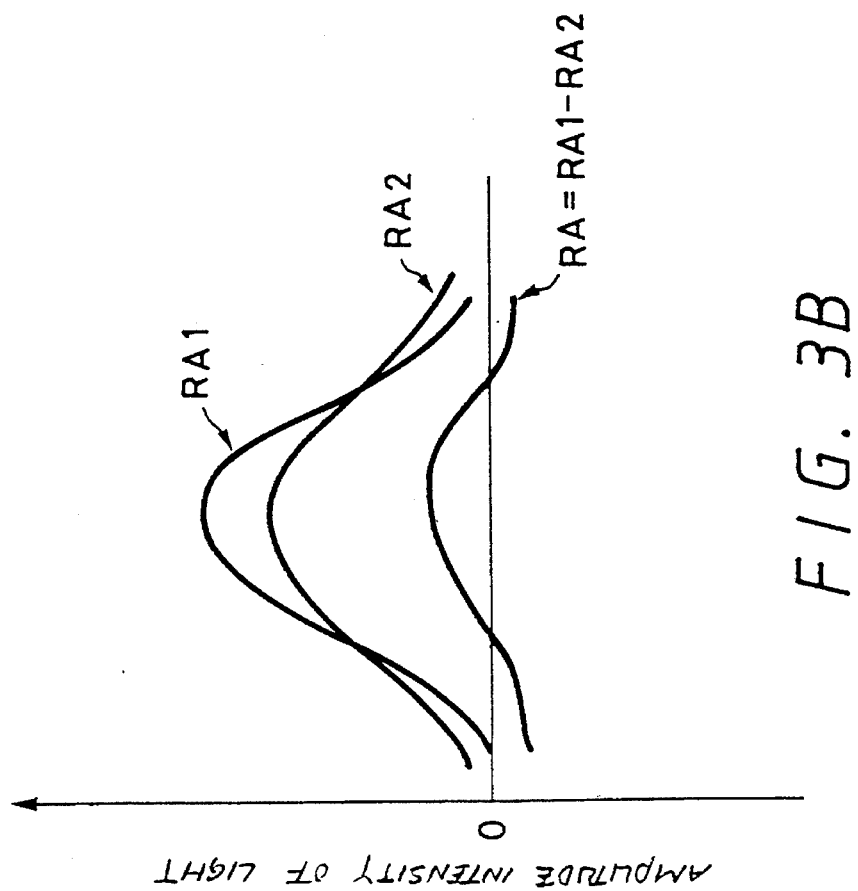
FIG. 3B is a schematic diagram showing a distribution of amplitude intensity of reflected lights.
Figure 3A:
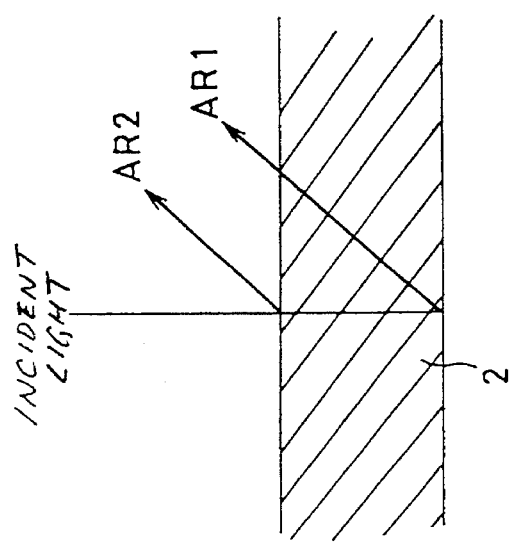
FIG. 3A is a cross-sectional view showing reflected lights and a saturable absorption dye containing layer.
Figure 4:
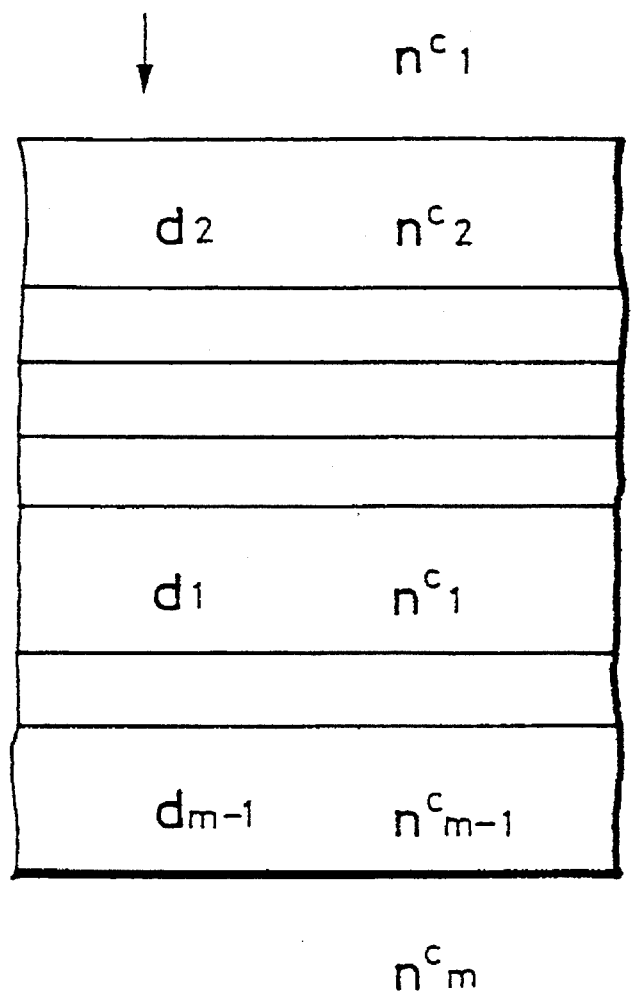
FIG. 4 is a schematic diagram showing a multi-layer system.

As shown in FIG. 2, there was prepared a disk-shaped substrate 1 on which a super resolution recording pattern 5 that is shorter as compared with the normal pit length and pit pattern cycle was formed by the glass 2P (photopolymer) method. In this experimental example, pit 5 having pit length of 0.3 μm were formed at a cycle of 0.6 μm.

Then, a high refractive index layer 3 made of $ZnS+SiO_2$ or the like was on the signal recording surface of the substrate 1, i.e., on the surface in which the pits 5 are formed by a sputtering or the like. In that case, a sintered 5-inch substrate in which a compositional ratio of ZnS and $SiO_2$ was 80:20 and whose purity was 99.99% was used as a target of the sputtering apparatus.

The sputtering apparatus was RF magnetron sputtering apparatus that was produced by SHIBAURA SEISAKUSHO KABUSHIKI KAISHA under the trade name of cfs-10 cp. Manufacturing conditions were such that an ultimate pressure was $3\times10^{-3}$ Pa, pressure at sputtering was $5\times10^{-1}$ Pa, a sputtering electric power was 1.2 kW and Ar gas and $O_2$ gas (90:10) were flowed. When a refractive index that can be manufactured under these conditions was measured by an ellipsometry, the measured refractive index was 1.8 at the wavelength of 780 nm.

At that time, the thickness of the layer 2 is selected to be λ/4 n where λ is the wavelength of the reproducing light and n is the refractive index thereof, for thereby satisfying a so-called nonreflective condition in which the light reflected by the boundary between the high refractive index layer 3 and the substrate 1 and the light reflected from the boundary between the high refractive index layer 3 and the saturable absorption dye containing layer formed thereon are 180° out of phase with each other. Since λ/4 n= 780/(4×1.8)=108.33, the optical recording medium was fabricated such that the thickness of the layer 2 was about 110 nm.

Figure 15:
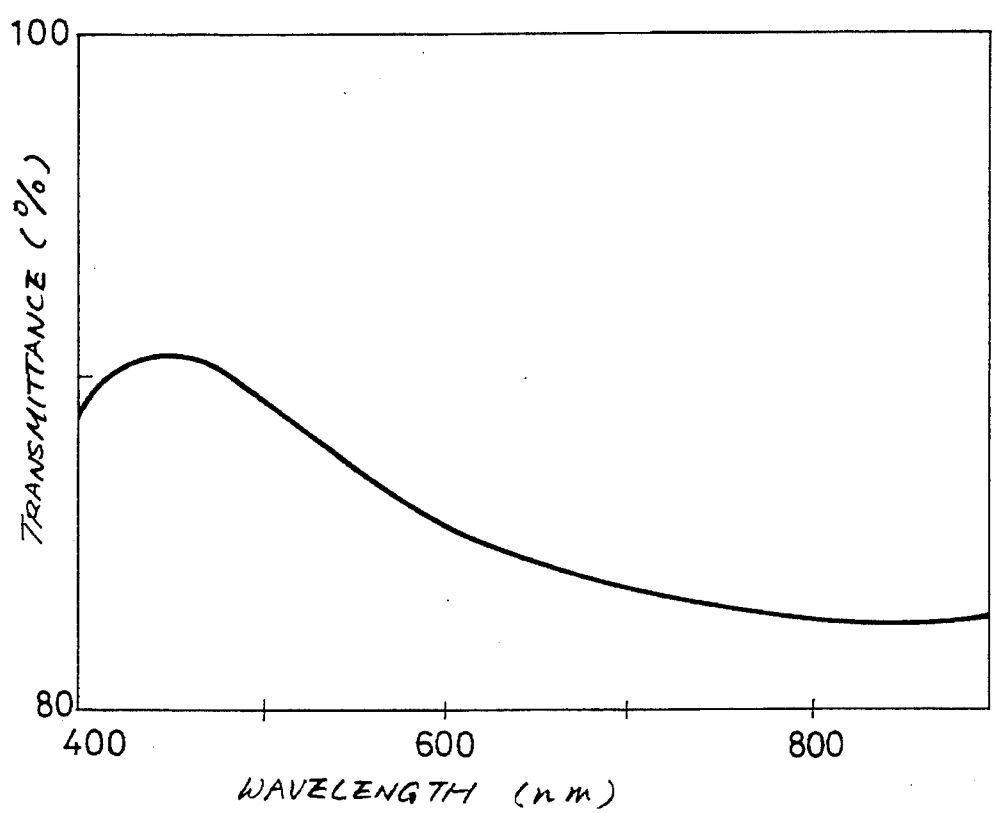
FIG. 15 is a diagram showing a spectrum of transmittances of an optical recording medium according to the present invention.

With the high refractive index layer 3 of $ZnS+SiO_2$ formed on the substrate 1, the assembly was measured for a spectrum of transmittances. The result is shown in FIG. 15. It can be seen from FIG. 15 that the transmittance drops at wavelengths near 800 nm, and the optical recording medium was fabricated while satisfying the thickness condition of λ/4 n.

The saturable absorption dye containing layer 2 was then formed on the above assembly as follows: Bis (tri-n-hexylsiloxy) silicon naphthalocyanine (SINC) was used as the saturable absorption dye, and polymethylacrylate (PMMA) was used as a matrix material.

The composition ratio was SINC:PMMA=1:5 (weight ratio). A spin coat solvent of anone (cyclohexanone) selected to apply the saturable absorption dye containing layer 2 uniformly to the disk-shaped substrate 1 was used. The solution to be coated was prepared by adding 1.31 g of PMMA (η=0.45) to 38.7 g of anone, agitating and heating the mixture to dissolve it, thereafter adding 0.262 g of SINC to the mixture, and dispersing the added SINC in the mixture with an ultrasonic cleaner, and heating the mixture to dissolve it.

The solution was coated with a spin coater (manufactured by MIKASA CORP.) at a maximum rotational speed ranging from 2000 to 2400 rpm. A uniform layer having a thickness of about 2000 nm was formed under such conditions. To dry the solvent, the formed layer was held in a vacuum at 80° C. for 2 hours.

Thereafter, an Al layer was formed as the reflecting layer 4 on the saturable absorption dye containing layer 2 by vacuum evaporation or the like. The vacuum evaporation apparatus used was manufactured by NICHIDEN ANERVA CORP., and a general vacuum evaporation process was carried out in which the degree of vacuum was $3\times10^{-4}$ Pa and the evaporation rate was about 0.4 nm/s. The thickness of the saturable absorption dye containing layer 2 was 100 nm as measured by a quartz oscillator thickness meter.

Figure 16:
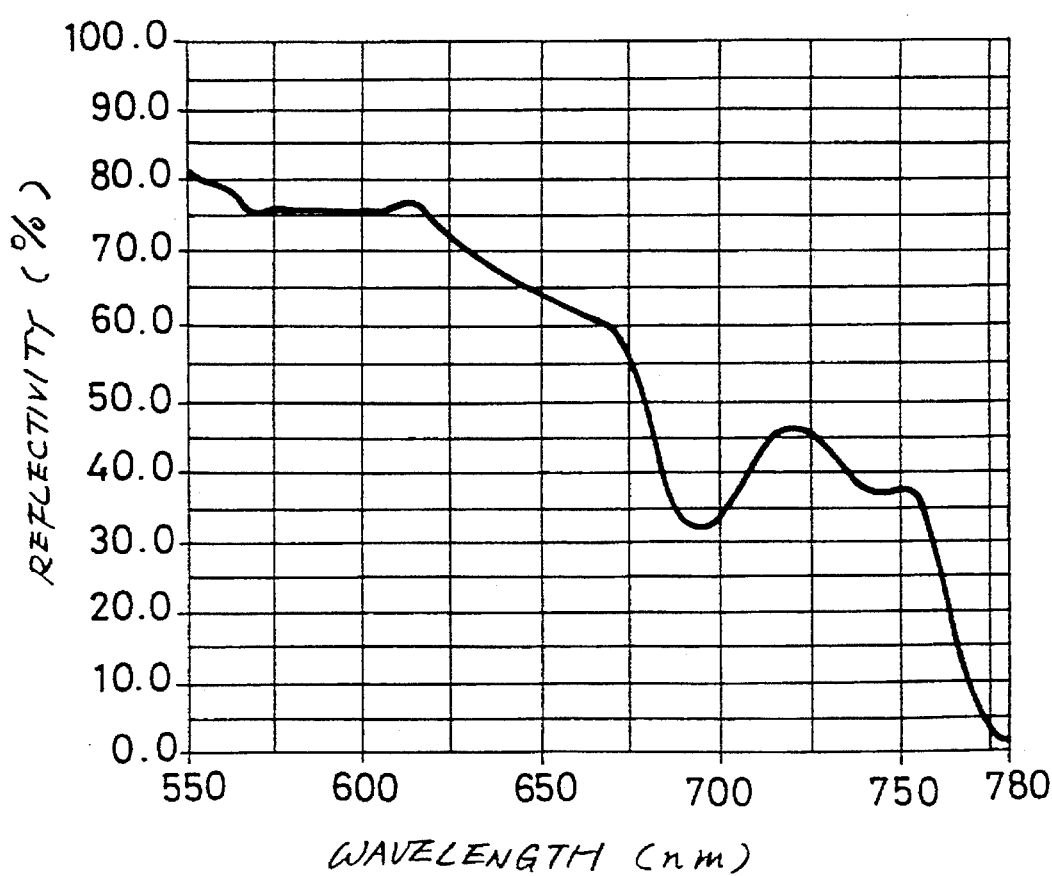
FIG. 16 is a diagram showing a spectrum of reflectivities of an optical recording medium according to the present invention.

A spectrum of reflectivities of the optical recording medium thus fabricated according to the present invention is shown in FIG. 16.

It can be understood from the above transmission and reflectivity spectra that the high refractive index layer 3 has a complex refractive index of about 1.8+i×0.01.

A signal recorded on the optical recording medium was reproduced by the optical system shown in FIG. 9.

A semiconductor laser for emitting a laser beam having a wavelength of 780 nm was used as the light source 14. The power of the laser beam applied to the optical recording medium ranged from 1 to 10 mW. The objective lens 11 had an NA (numerical aperture) of 0.53. The optical system had a spatial cutoff cycle (λ/2 NA) of 0.74 μm, which is relatively large as compared with the pit length of 0.3 μm and the pit cycle of 0.6 μm. Therefore, the recorded signal cannot be read without relying upon the super resolution phenomenon.

Figure 17:
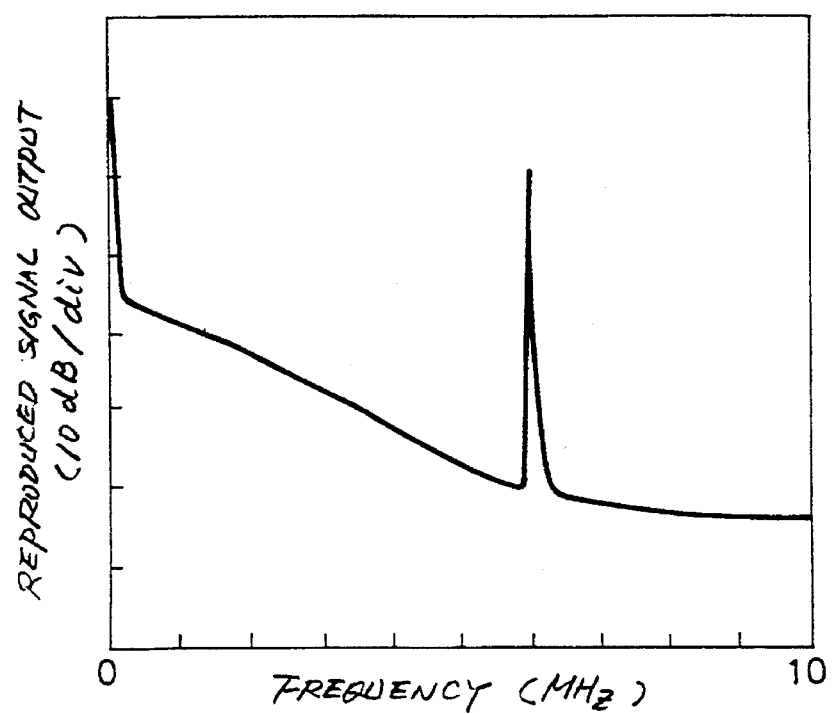
FIG. 17 is a diagram showing a spectrum of reproduced signal outputs from an optical recording medium according to the present invention.

When a signal having a frequency of 6 MHz was reproduced from the optical recording medium 10, it was possible to reproduce the signal at a carrier-to-noise ratio (CNR) of 40 dB or higher. The power spectrum of the reproduced signal is shown in FIG. 17. Changes in the CNR were checked when the reproducing light power and the linear velocity of the rotating optical recording medium were changed. The results are given in Table 1 below.

TABLE 1

| Linear velocity [m/s] | Power [mW] | | | | | | | |
|---|---|---|---|---|---|---|---|---|
| | 3 | 3.9 | 4 | 4.5 | 4.8 | 5 | 6 | 6.5 |
| 3 | 25 | 39 | | | | | | |
| 3.6 | 33 | | 35 | 38 | 41 | | | |
| 5.4 | | | 35 | | | 39 | 42 | |
| 7.2 | | | | | | 40 | 31 | 35 |

It will be seen from the results in Table 1 that the reproduced signal output of 40 dB or higher could be obtained when the reproducing light power was 4.8 mW and the linear velocity of 3.6 m/s, and also when the reproducing light power was 6 mW and the linear velocity of 5.4 m/s.

Concerning the stability of signal reproduction, the signal was reproduced 1000 times or more from any mediums within the measured laser power range, confirming that the materials and layer structures described above are highly stable.

Dyes that can be used in the saturable absorption dye containing layer 3 with a reproducing light wavelength ranging from 750 to 830 nm may be a cyanine-based dye, a phthalocyanine-based dye, and a naphthalocyanine-based dye. For example, dyes produced by EXCITON corporation (U.S.A.) under the trade names of DTTC, HITC, IR-125, IR-140, IR-144 or the like may be employed. In particular, the naphthalocyanine-based dye is preferable because it has a large molecular extinction coefficient and high optical stability.

According to the present invention, the high refractive index layer 3 is disposed between the substrate 1 and the saturable absorption dye containing layer 2, the high refractive index layer 3 having a refractive index higher than those of the substrate 1 and the saturable absorption dye containing layer 2. However, a low refractive index layer having a refractive index lower than those of the substrate 1 and the saturable absorption dye containing layer 2 may be employed in place of the high refractive index layer 3 similarly to provide a resonator structure to confine light within the saturable absorption dye containing layer 2 for increasing the intensity of a reproduced signal. It has been found out from the study of the inventor that the greater the difference between the refractive index of the high or low refractive index layer and those of the substrate 1 and the saturable absorption dye containing layer 2, the greater the advantages of the optical recording medium.

The refractive indexes of the substrate 1 and the saturable absorption dye containing layer 2 fall substantially in the range of from 1.4 to 1.8. Low refractive index materials generally have a refractive index of about 1.4 though a silica sol gel film having a structure including long minute pores and a refractive index of about 1.2. High refractive index materials may be various inorganic materials and semiconductor materials that have a refractive index of up to 4, and are advantageous in that they provide a large refractive index difference.

In the above embodiment, a high refractive index material having a real-part refractive index n of 1.8 was employed as making up the high refractive index layer 2. If the real-part refractive index is higher than that, it is possible to provide a resonator structure which increases Fresnel reflection and confines light effectively in the saturable absorption dye containing layer 2 for increasing the intensity of a reproduced signal. According to the present invention, therefore, a high refractive index material having a real-part refractive index of 1.8 or greater is selected as the material of the high refractive index layer 2. Conversely, if a low refractive index layer is employed, then it is apparently effective to employ a material having a lower refractive index as making up such a low refractive index layer.

Where the extinction coefficient is smaller, the saturable absorption dye containing layer 2 can absorb light more efficiently. Therefore, it is preferable to employ a material having a relatively small extinction coefficient.

If the thickness of the high refractive index layer is selected to be $\lambda/4\,n$ where n is the refractive index thereof and $\lambda$ is the wavelength of the reproducing light, then the Fresnel reflection is maximum for maximum reproduced signal intensity. However, the high refractive index layer is sufficiently effective even if the thickness thereof varies by about 10%.

The high refractive index layer is formed by a vacuum thin-film fabrication process such as vacuum evaporation, sputtering, CVD (chemical vapor deposition), or the like. If the substrate is made of a polymer or glass 2P (resist film), then it is advantageous to rely upon the sputtering process which can fabricate a good high refractive index layer at relatively low temperature at a relatively high film growth speed.

Where inorganic ceramic was used as the high refractive index material, it was possible to increase the reproduced signal output sufficiently, as described above, by forming a film composed of a mixture of ZnS and $SiO_2$ which is highly heat-resistant and has a high film growth capability.

According to the present invention, as described above, it is possible to reproduce minute recorded pits at about 0.3 μm/bit by way of super resolution. Thus, an optical recording medium that is of about the same size as the presently available optical recording mediums can store an amount of information which is about four times the amount of information storable on the presently available optical recording mediums, without greatly modifying the reproducing apparatus, e.g., reducing the reproducing light wavelength, using a focusing lens having a large numerical aperture, or modifying the single demodulation process.

By combining the principles of the present invention with another technique for recording information at a higher density, it becomes possible to record information at a density several tens times greater, e.g., to construct digital and high-definition television video disks of CD size.

The present invention is also applicable to disks having a recordable layer. For example, when the present invention is applied to various optical recording mediums including a WO (Write Once) optical recording medium having a recording density four times greater and a rewritable optical recording medium of the write-once or erasable type, the recording density can further be increased.

Figure 18:
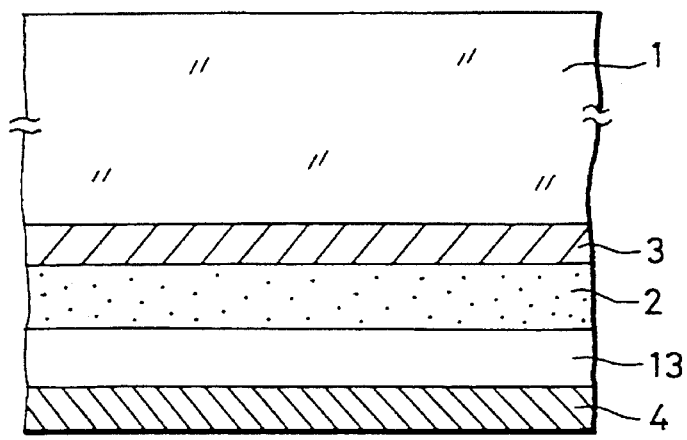
FIG. 18 is an enlarged fragmentary cross-sectional view of an optical recording medium according to another embodiment of the present invention.

FIG. 18 illustrates, in enlarged fragmentary cross section, a rewritable optical recording medium to which the principles of the present invention are applied. The rewritable optical recording medium includes a high refractive index layer 3, a saturable absorption dye containing layer 2, a recording layer 13 of a phase change material, for example, and a reflecting layer 4 which are successively deposited on a substrate 1 by sputtering, vacuum evaporation, or the like. A recording pattern is recorded in the form of pits in the recording layer 13.

With the arrangement shown in FIG. 18, there is generated in a reproducing light spot a region where the absorptivity is partially saturated into zero to produce reflected light, achieving super resolution. The addition of the high refractive index layer 3 increases the reproduced signal output as with the above embodiment.

According to the present invention, as described above, an optical recording medium for recording an information signal as a corresponding recorded pattern of concavities and convexities or changes of optical characteristics on a transparent substrate and reproducing the recorded information signal by detecting a reflection of reproducing light which is applied perpendicularly thereto through the transparent substrate and moved and scanned over the transparent substrate, has a layer including at least a saturable absorption dye on the recorded pattern, the saturable absorption dye having a molecular extinction coefficient $\epsilon$ greater than $10^4$ at the wavelength of the reproducing light, and a relaxation time $\tau$ in the range of 1 ns<$\tau$<100 ns. It is possible to extract the reproducing light which has a spot diameter smaller than the diffraction limit of the reproducing light. Therefore, the recording pattern which is greatly reduced in size can be reproduced, and the optical recording medium can sufficiently record information at a higher density According to the present invention, it is possible to increase the recording density without substantially modifying the reproducing optical system and the information recording system, and to achieve a recording density that is about four times higher than the conventional optical recording mediums. It is also possible to largely increase the recording density by combining the present invention with a high density recording technique that is realized by modifying the reproducing optical system and the information recording system. The optical recording medium according to the present invention is thus of a very high engineering value. The present invention is also applicable to a writeonce or rewritable optical recording medium having a recordable layer, and hence a write-once or rewritable optical recording medium with a greatly improved recording density can be realized.

According to the present invention, furthermore, an optical recording medium may comprise a transparent substrate, a saturable absorption dye containing layer, and a reflecting layer having a reflectivity of 70% or more on the air boundary, which are successively arranged. Greater advantages can be attained by either selecting the thickness of the saturable absorption dye containing layer so as to substantially minimize the intensity of reflected light due to interference with respect to the intensity of reproducing light, or selecting a naphthalocyanine-based dye as the saturable absorption dye.

In addition, where the absorptivity of the saturable absorption dye containing layer is partially reduced to zero to increase the reflectivity high enough to read a recorded pit in a region where a reproducing light spot is applied, there is achieved a super resolution which makes it possible to read signals having a period smaller than the spatial cutoff cycle ($\lambda$/2 NA) that is determined by the reproducing optical system. With the high refractive index layer 3 interposed between the substrate 1 and the saturable absorption dye containing layer 2, a resonator is created within the saturable absorption dye containing layer 3 for increasing the reproduced signal output to effect practical signal reproduction.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A high density optical recording medium adapted to have an information signal recorded thereon in a corresponding pattern of changes in optical characteristics in a transparent substrate and adapted to reproduce the recorded information signal by detecting a reflection of reproducing light being applied perpendicularly thereto through the transparent substrate and moved and scanned over the transparent substrate, said high density recording medium consisting essentially of:

a transparent substrate;

a high refractive index layer comprising a sintered mixture of ZnS and $SiO_2$ disposed on said substrate having a refractive index including a real portion refractive index of about 1.8 or higher and having a layer thickness of about $\lambda/4n_1 \pm 10\%$, wherein $\lambda$ is the wavelength of reproducing light and $n_1$ is the refractive index of the high refractive index layer;

a saturable absorption dye containing layer disposed on said high refractive index layer comprising a naphthalocyanine-based saturable absorption dye and a polymeric binder, said dye having a molecular extinction coefficient $\epsilon$ of $10^4$ or greater at a wavelength, $\lambda$, of reproducing light and a relaxation time $\tau$ in a range of from greater than or equal to about 1 nanosecond to less than or equal to about 100 nanoseconds, the saturable absorption dye layer having a thickness dimension of about $\lambda/4n_2$, where $\lambda$ is the wavelength of the reproducing light and $n_2$ is the refractive index of the saturable absorption dye containing layer; and a reflecting layer disposed on said saturable absorption dye layer having a reflectivity of 70% or higher on an air boundary thereof.

2. A high density optical recording medium as defined in claim 1, wherein the light transmitting substrate is selected from glass or an optically transmissive thermoplastic polymer.

3. A high density optical recording medium as defined in claim 1, wherein said saturable absorption dye-containing layer comprises a polymethyl methacrylate polymeric binder.

4. A high density optical recording medium as defined in claim 1, wherein the saturable absorption dye layer comprises bis(tri-n-hexylsiloxy) silicon naphthalocyanine and a polymethyl methacrylate polymeric binder.

5. A high density optical recording medium as defined in claim 1, wherein said reflecting layer comprises aluminum.

6. A high density optical recording medium as defined in claim 1 capable of reproducing minute recorded pits at about 0.3 micrometers/bit by way of super resolution.

* * * * *